(12) United States Patent
Wong et al.

(10) Patent No.: US 11,040,775 B2
(45) Date of Patent: Jun. 22, 2021

(54) SEAT ASSEMBLIES, SUCH AS FOR USE IN AIRCRAFT, AND ASSOCIATED SYSTEMS AND METHODS

(71) Applicant: Dynamic Safety LLC, Mukilteo, WA (US)

(72) Inventors: Charles K. Wong, Mukilteo, WA (US); Yi Jason Dai, Mukilteo, WA (US); Sang Wu, Mukilteo, WA (US)

(73) Assignee: Dynamic Safety LLC, Mukilteo, WA (US)

( * ) Notice: Subject to any disclaimer, the term of this patent is extended or adjusted under 35 U.S.C. 154(b) by 192 days.

(21) Appl. No.: 16/266,906

(22) Filed: Feb. 4, 2019

(65) Prior Publication Data
US 2020/0247546 A1 Aug. 6, 2020

(51) Int. Cl.
*B64D 11/06* (2006.01)

(52) U.S. Cl.
CPC ........ *B64D 11/064* (2014.12); *B64D 11/0648* (2014.12); *B64D 11/0649* (2014.12); *B64D 11/0638* (2014.12)

(58) Field of Classification Search
CPC .............. B64D 11/064; B64D 11/0648; B64D 11/0649
See application file for complete search history.

(56) References Cited

U.S. PATENT DOCUMENTS

| 6,695,406 | B2 | 2/2004 | Plant |
| 9,227,729 | B2 | 1/2016 | Udriste et al. |
| 9,656,583 | B2 * | 5/2017 | Gaither ................. B60N 2/22 |
| 2005/0127740 | A1 | 6/2005 | Dowty |
| 2017/0021930 | A1 * | 1/2017 | Henshaw |

FOREIGN PATENT DOCUMENTS

DE 102015111844 A1 1/2017

OTHER PUBLICATIONS

Extended European Search Report dated Jun. 25, 2020 in European Patent Application No. 20154945.8, 8 pages.

* cited by examiner

*Primary Examiner* — Anthony D Barfield
(74) *Attorney, Agent, or Firm* — Perkins Coie LLP

(57) ABSTRACT

Seats and seat assemblies, such as for installation into aircraft, are described herein. In some embodiments, a seat assembly can include a framework configured to be mounted within an aircraft and a plurality of seats coupled to the framework. Each seat can include (a) a seat pan slidably coupled to the framework and (b) a seat back pivotally coupled to the framework and rotatable between an upright position and a reclined position. In some embodiments, the seat back is operably coupled to the seat pan such that movement of the seat back from the upright position to the reclined position moves the seat pan away from seat back to increase the effective recline of the seat.

23 Claims, 12 Drawing Sheets

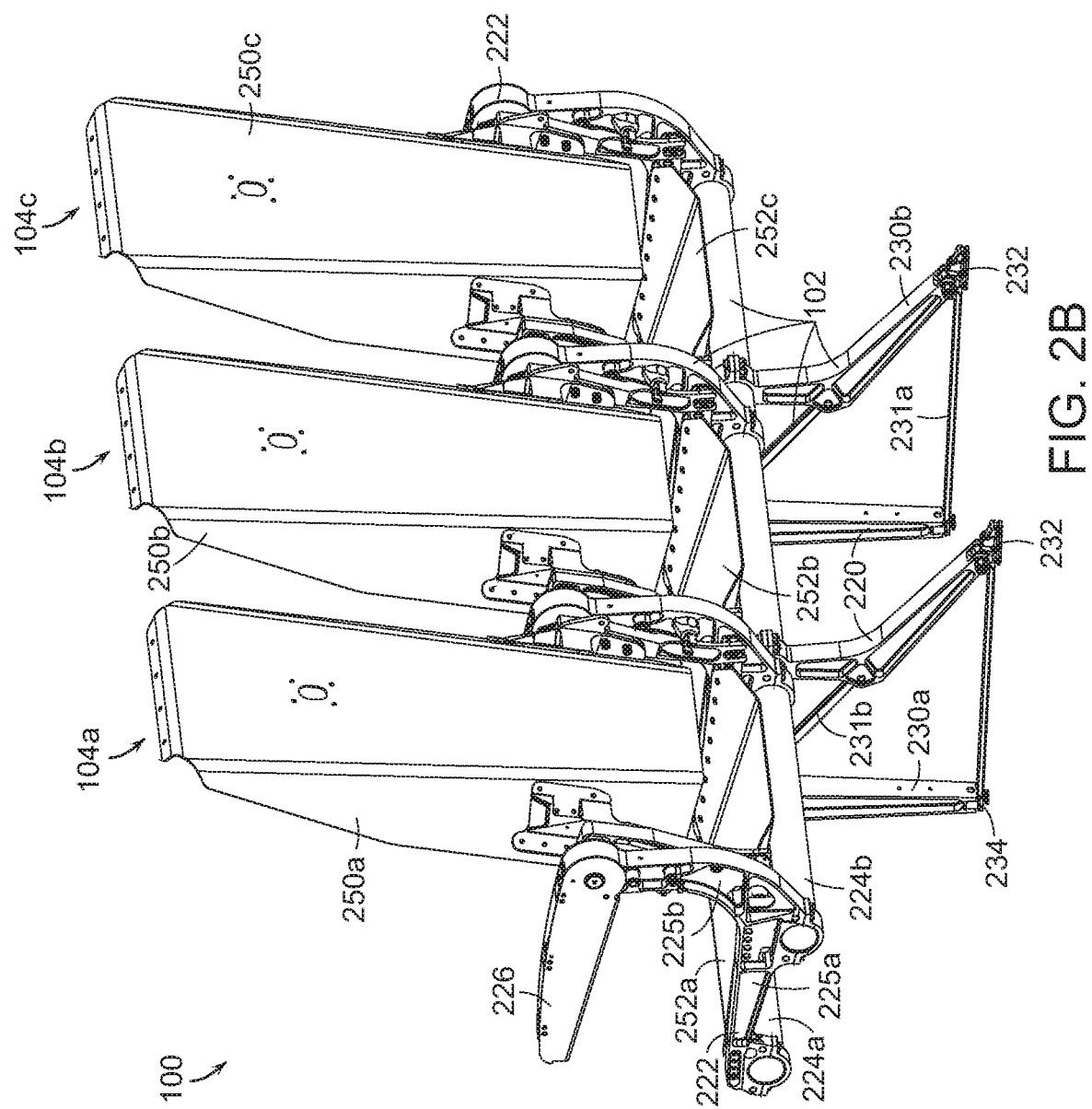

SEAT ASSEMBLIES, SUCH AS FOR USE IN AIRCRAFT, AND ASSOCIATED SYSTEMS AND METHODS

TECHNICAL FIELD

The present technology relates generally to seat assemblies. In particular, some embodiments of the present technology are directed to seat assemblies configured to be installed into passenger transportation vehicles, such as commercial airliners.

BACKGROUND

Aircraft seats must meet a number of weight, size, and regulatory demands due to the unique environment in which they are used. For example, aircraft seats must satisfy government regulations involving aircraft safety. At the same time, airlines often demand seats that are lightweight and that occupy relatively little space in order to maximize the passenger density within the aircraft they operate. To meet these demands, the cushions on many aircraft seats are made relatively thin to lighten the seats and improve the economical operation of the aircraft in which they are used. Likewise, the permissible recline of seats is reduced to limit interference with aft passengers and enable a tighter seat pitch and thus a greater number of total seats in the aircraft. Reducing the effective recline and cushioning of aircraft seats makes them more uncomfortable for passengers, but airlines still desire seats that are comfortable and convenient for passengers. Accordingly, there is a need in the art for aircraft seats that provide improved passenger comfort while also meeting airline demands for lightweight seats that comply with all applicable regulations and that occupy a small space.

BRIEF DESCRIPTION OF THE DRAWINGS

Many aspects of the present disclosure can be better understood with reference to the following drawings. The components in the drawings are not necessarily to scale. Instead, emphasis is placed on clearly illustrating the principles of the present technology.

FIGS. 2A and 2B are an isometric front view and an isometric rear view, respectively, of the seat assembly of FIGS. 1A and 1B configured in accordance with an embodiment of the present technology.

DETAILED DESCRIPTION

A. Overview

Figure 1A:
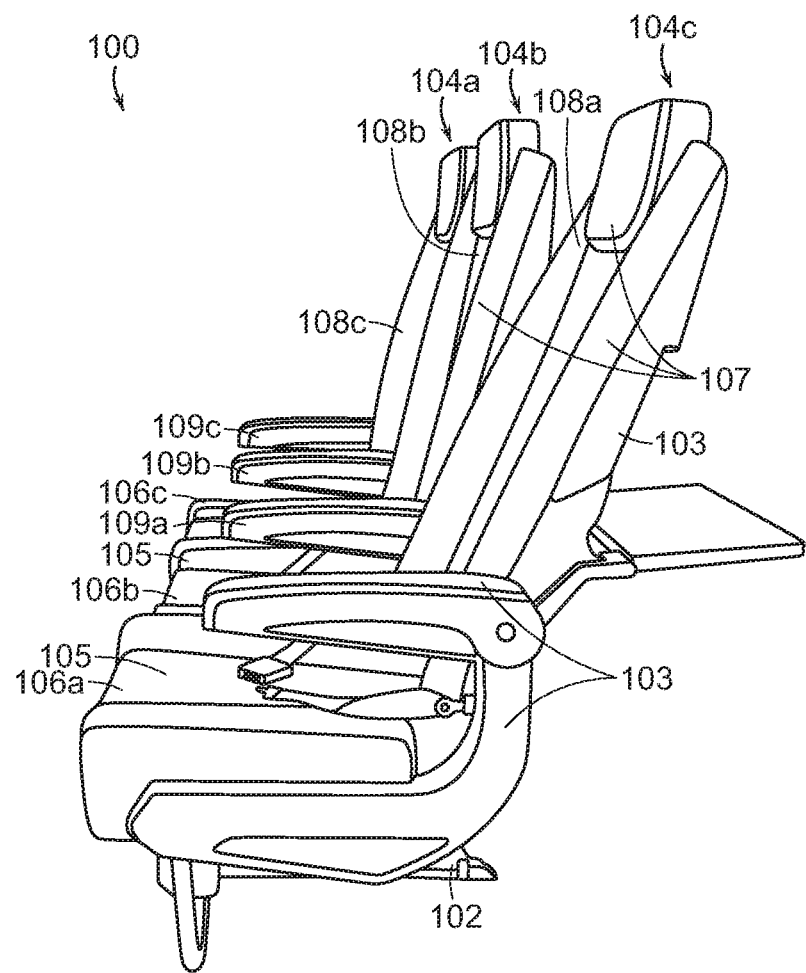
FIGS. 1A and 1B are a perspective side view and a perspective rear view, respectively, of a seat assembly configured in accordance with an embodiment of the present technology.

Aspects of the present disclosure are directed generally toward seats assemblies for use in passenger transportation vehicles, such as aircraft. In several of the embodiments described below, for example, a seat assembly can include a framework configured to be secured to an interior floor of an aircraft. The seat assembly can include a seat back and a seat pan coupled to the framework and configured to receive and support a passenger. In some embodiments, the seat back is pivotally coupled to the framework and is movable between an upright position and a reclined position. In some embodiments, the seat pan is slidably coupled to the framework and is movable between a rear position and a forward position. The seat back can be mechanically coupled to the seat pan such that the seat back and seat pan are mechanically synchronized to move together. For example, movement of the seat back from the upright position to the reclined position can drive the seat pan from the rear position to the forward position. By moving the seat pan forward at the same time the seat back is reclined, the effective recline of the seat assembly can be increased as compared to, for example, conventional aircraft seats in which the seat pan remains stationary when the seat back is reclined.

Additionally, the effective recline of the seat assembly is increased without also increasing the intrusion of the seat back into the space of another passenger seated behind the seat assembly (an "aft passenger"). Moreover, in some embodiments the pivot axis of the seat back is positioned relatively high compared to a lower edge of the seat back to further reduce the intrusion of the seat back into the space of the aft passenger during recline. Accordingly, seat assemblies configured in accordance with the present technology are expected to increase total passenger comfort on an aircraft by both enabling passengers to recline to a greater degree in their seats and also minimizing the intrusion of the seats into the space of aft passengers.

In another aspect of the present technology, an actuator (e.g., a hydraulic lock) can be coupled between the framework and the seat back and configured to enable/disable movement of the seat back in response to a passenger pressing a button on an armrest of the seat assembly. Because the seat back can be mechanically coupled to the seat pan, only a single actuator is needed to effect movement of both the seat back and the seat pan. Moreover, in some embodiments the seat back can be mechanically coupled to opposing sides of the seat pan and configured to evenly drive the seat pan from both sides. In some such embodiments, the actuator can be positioned off-center with respect to a vertical axis of the seat back while still enabling the seat pan to be driven evenly from both sides.

In another aspect of the present technology, the seat back and/or seat pan can be formed from unidirectional tape, fabric, short fiber composites, and/or semi-rigid thermal plastic sheets, resulting in a unitary and lightweight structure. For example, in some embodiments the seat pan and/or seat back can be stamped/molded to have a thin but comfortable and supportive shape. The seat pan can be suspended between opposing portions of the framework and configured to flex in response to a load thereon (e.g., the weight of a passenger seated on the seat pan). The flex of the seat pan can also enable the seat pan to conform to the posterior shape of the passenger positioned thereon—further increasing passenger comfort. Moreover, enabling the seat pan to flex can provide a more stable/even load path from the seat pan to the framework and to the aircraft as compared to conventional rigid seat pans. For example, when the seat pan flexes, the load can be directed more vertically through the framework and reduces the stress on the seat pan.

In another aspect of the present technology, the framework of the seat assembly can be partially pivotally mounted to the floor of the aircraft to permit movement of the framework, for example, in response to torsional loads and/or other forces on the frame of the aircraft. For example, in some embodiments the framework of the seat can include a plurality of leg assemblies configured to be attached to the aircraft floor. The leg assemblies can each include a first portion fixedly attached to the aircraft floor and a second portion pivotally mounted to the floor to permit some lateral (e.g., side-to-side) movement of the framework relative to the frame of the aircraft. The pivotal coupling can better distribute the loads on the seat assembly from landing, takeoff, turbulence, etc., of the aircraft, thereby reducing wear on the seat assembly and increasing the longevity/service life of the seat assembly.

In some embodiments, multiple seat backs and seat pans can be coupled to the same framework to define a seat assembly having multiple, adjacent seats. Such seat assemblies can be sized for use in commercial aircraft of different sizes (e.g., single-aisle or wide-body aircraft) and can include one, two, three, four, five, or more interconnected seats. In some embodiments, the seat assemblies of the present technology can be installed in passenger transportation vehicles other than aircraft such as, for example, trains, boats, ferries, buses, etc.

Certain details are set forth in the following description and in FIGS. 1A-7 to provide a thorough understanding of various embodiments of the present technology. In other instances, well-known structures, materials, operations, and/or systems often associated with aircraft, aircraft seat assemblies, hydraulic actuators, etc., are not shown or described in detail in the following disclosure to avoid unnecessarily obscuring the description of the various embodiments of the technology. Those of ordinary skill in the art will recognize, however, that the present technology can be practiced without one or more of the details set forth herein, or with other structures, methods, components, and so forth.

The terminology used below is to be interpreted in its broadest reasonable manner, even though it is being used in conjunction with a detailed description of certain examples of embodiments of the technology. Indeed, certain terms may even be emphasized below; however, any terminology intended to be interpreted in any restricted manner will be overtly and specifically defined as such in this Detailed Description section.

The accompanying Figures depict embodiments of the present technology and are not intended to be limiting of its scope. The sizes of various depicted elements are not necessarily drawn to scale, and these various elements may be arbitrarily enlarged to improve legibility. Component details may be abstracted in the Figures to exclude details such as position of components and certain precise connections between such components when such details are unnecessary for a complete understanding of how to make and use the present technology. Many of the details, dimensions, angles and other features shown in the Figures are merely illustrative of particular embodiments of the disclosure. Accordingly, other embodiments can have other details, dimensions, angles and features without departing from the spirit or scope of the present technology. In addition, those of ordinary skill in the art will appreciate that further embodiments of the present technology can be practiced without several of the details described below.

B. Selected Embodiments of Seat Assemblies and Methods for Forming the Same

Figure 1B:
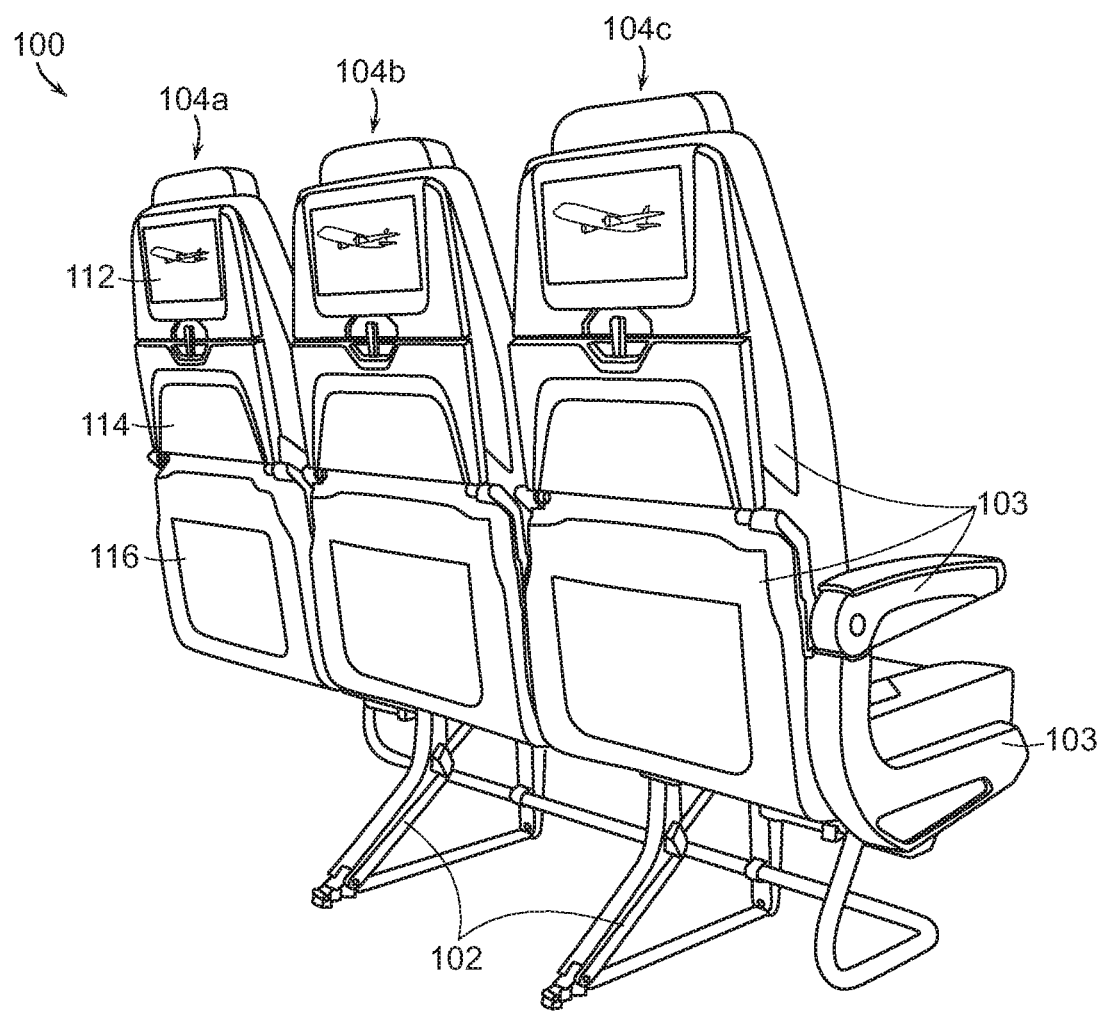

FIGS. 1A and 1B are a perspective side view and a perspective rear view, respectively, of a seat assembly 100 configured in accordance with an embodiment of the present technology. The seat assembly 100 is configured to be installed into a passenger transportation vehicle such as an aircraft, bus, ferry, train, etc. Referring first to FIG. 1A, for example, the seat assembly 100 includes a framework 102 and seats 104 (identified individually as first through third seats 104a-104c) coupled to the framework 102 (partially obscured in FIG. 1A; described in detail below with reference to FIGS. 2A and 2B). The seats 104 each include a lower portion 106 (identified individually as first through third lower portions 106a-106c) and an upper portion 108 (identified individually as first through third upper portions 108a-108c) operably coupled to the framework 102. An outer façade 103 can be coupled to the framework 102 to at least partially enclose inner portions of the seat assembly 100 and to provide an aesthetically pleasing, continuous outer surface for the seat assembly 100. In some embodiments, the framework 102 can be formed from carbon fiber, aluminum, high strength aluminum alloys, or other rigid and light-weight materials, and the façade 103 can be formed from a plastic or other suitable material. The lower portions 106 can each include a seat pan (obscured in FIG. 1A; described in detail below with reference to FIG. 4A) and one or more cushions 105 coupled to the seat pan, and the upper portions 108 can each include a seat back (obscured in FIG. 1A; described in detail below with reference to FIG. 5A) and one or more cushions 107 coupled to the seat back.

Some or all of the lower portions 106 can be slidably coupled to the framework 102 and individually movable between (i) a rear position (e.g., a takeoff, taxi, and landing (TTL) position) and (ii) a forward position (e.g., a reclined position) in which the lower portions 106 are slid forward away from the upper portions 108. The upper portions 108 can be pivotally coupled to the framework 102 and individually movable between (i) an upright position (e.g., a TTL position) and (ii) a reclined position in which a slope/angle of the upper portions 108 is less than in the upright position. For example, in the illustrated embodiment the first lower portion 106a is in the forward position while the second and third lower portions 106b and 106c are in the rear position, and the first upper portion 108a is in the reclined position while the second and third upper portions 108b and 108c are in the upright position.

As described in greater detail below, in some embodiments the upper portions 108 are mechanically coupled to the lower portions 106 such that movement of the upper portions 108 simultaneously drives movement of the lower portions 106. For example, the seats 104 can be individually movable between (i) a first position (e.g., a TTL position) in which the upper portions 108 are in the upright position and the lower portions 106 are in the rear position and (ii) a second position (e.g., a reclined position) in which the upper portions 108 are in the reclined position and the lower portions 106 are in the forward position. For example, in the illustrated embodiment the first seat 104a is in the second position while the second and third seats 104b and 104c are in the first position.

In some embodiments, the seat assembly 100 further includes buttons 109 (identified individually as first through third buttons 109a-109c) that are depressable/actuatable by passengers seated in the seats 104 to enable movement of the seats 104 between the first and second positions. For example, depression of the first button 109a can permit the first upper portion 108a to move between the upright and reclined positions, while movement of the first upper portion 108a is locked when the first button 109a is not depressed. More specifically, in some embodiments a passenger seated in the first seat 104a can depress the first button 109a and lean backward against the first upper portion 108a to move the first upper portion 108a from the upright position to the reclined position illustrated in FIG. 1A. At the same time, movement of the first upper portion 108a can drive the first lower portion 106a from the rear position to the forward position illustrated in FIG. 1A. In one aspect of the present technology, the forward movement (e.g., in a direction away from the upper portions 108) of the lower portions 106 increases the effective recline of the seats 104 as compared to conventional seat assemblies, without increasing the amount the upper portions 108 encroach upon the space of passengers positioned behind the seat assembly 100 ("aft passengers").

Referring to FIG. 1B, aft-facing portions of the seats 104 can include various components, systems, etc., for the aft passengers (not shown) to interact with. For example, each of the seats 104 can include a display screen 112 (e.g., a touchscreen display), a tray table 114 pivotally mounted to the framework 102, a storage bag/compartment 116, and/or other components.

Figure 2A:
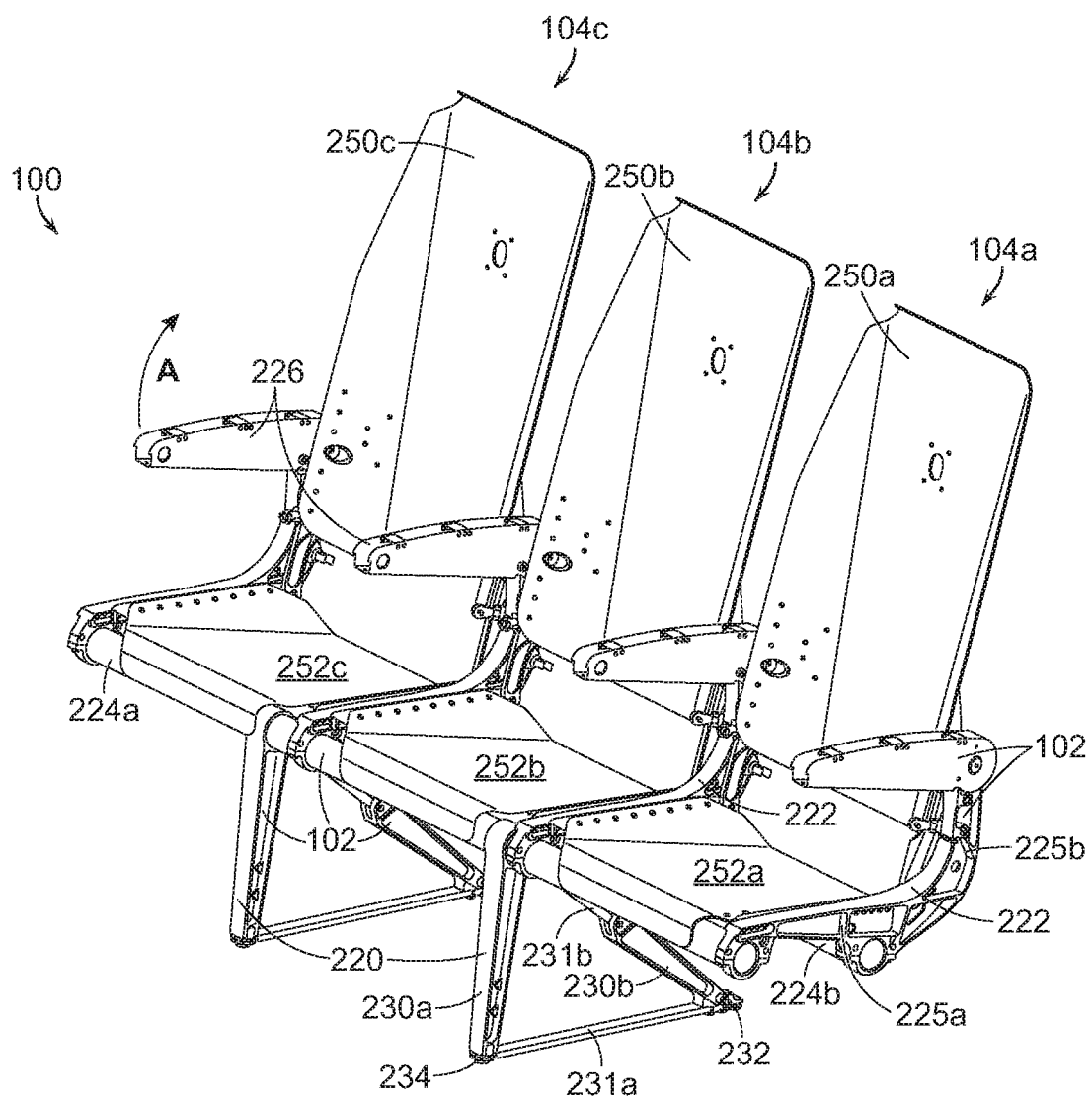

FIGS. 2A and 2B are an isometric front view and an isometric rear view, respectively, of the seat assembly 100 shown in FIGS. 1A and 1B configured in accordance with an embodiment of the present technology. For purposes of illustration, the façade 103, the seat cushions 105, 107, the display screens 112, the tray tables 114, and the storage bags 116 are not shown in FIGS. 2A and 2B. Referring to FIGS. 2A and 2B together, the seat assembly 100 includes the framework 102, and seat backs 250 (identified individually as first through third seat backs 250a-250c) and seat pans 252 (identified individually as first through third seat pans 252a-252c) movably coupled to the framework 102. The first seat back 250a and the first seat pan 252a together define the load-bearing structure of the first seat 104a. Similarly, the second seat back 250 and the second seat pan 252b together define the load-bearing structure of the second seat 104b, and the third seat back 250c and the third seat pan 252c together define the load-bearing structure of the third seat 104c. As noted above, various components of the framework 102 may be composed of aluminum, carbon fiber, high strength aluminum alloy, and/or other rigid and strong materials for absorbing the various loads on the seat assembly 100—for example, the weight of passengers seated in the seats 104 and the loads/torques from operation of the vehicle into which the seat assembly 100 is installed.

In the illustrated embodiment, the framework 102 includes leg assemblies 220 and spreader assemblies 222 each coupled to crossbars 224 (identified individually as a forward crossbar 224a and a rear crossbar 224b). The crossbars 224, for example, can be hollow elongate tubes (as opposed to solid rods) to reduce the overall weight of the seat assembly 100. In some embodiments, the spreader assemblies 222 can be generally similar or identical to one another. For example, in the illustrated embodiment each of the spreader assemblies 222 has a generally curved shape including a generally horizontal portion 225a coupled to the crossbars 224 and a generally vertical portion 225b extending from the horizontal portion 225a. The leg assemblies 220 can also be generally similar or identical to one another and can each include a forward leg 230a coupled to the forward crossbar 224a and a rear leg 230b coupled to the rear crossbar 224b. In some embodiments, the legs 230 can be coupled together via one or more spreaders 231 (identified individually as first spreaders 231a and second spreaders 231b). In some embodiments, upper end portions of the legs 230 and the horizontal portions 225a of the spreader assemblies 222 are configured to engage (e.g., partially surround/encircle) the crossbars 224 and are secured to the crossbars 224 via bolts, rivets, etc. In other embodiments, the leg assemblies 220 and/or the spreader assemblies 222 can be welded to or integrally formed with the crossbars 224.

The framework 102 can further include armrest assemblies 226 individually coupled to the vertical portions 225b of corresponding spreader assemblies 222. In some embodiments, the armrest assemblies 226 are rotatably coupled to the spreader assemblies 222 such that the armrest assemblies 226 are rotatable in a first direction (indicated by the arrow A in FIG. 2A) from a generally horizontal position to a generally vertical position (e.g., to facilitate the entry/exit of passengers from the seats 104). In other embodiments, the framework 102 can include more or fewer than the illustrated three seats 104, two leg assemblies 220, four spreader assemblies 222, two crossbars 224, four armrest assemblies 226, etc. For example, the seat assembly 100 can include more than three seats 104 (and a corresponding greater number of the assemblies 220, 222) when the seat assembly 100 is intended for installation into the center row of a wide-body aircraft. Likewise, the seat assembly 100 could include fewer than three seats 104 when the seat assembly 100 is intended for installation into a smaller aircraft.

The leg assemblies 220 are each configured to be attached to a surface such as, for example, the floor of the vehicle into which the seat assembly 100 is installed In the illustrated embodiment, the rear legs 230b are configured to be fixedly mounted to the surface via connecting bases 232 while the forward legs 230a are configured to be pivotally mounted to the surface via pivot features 234.

Figure 3A:
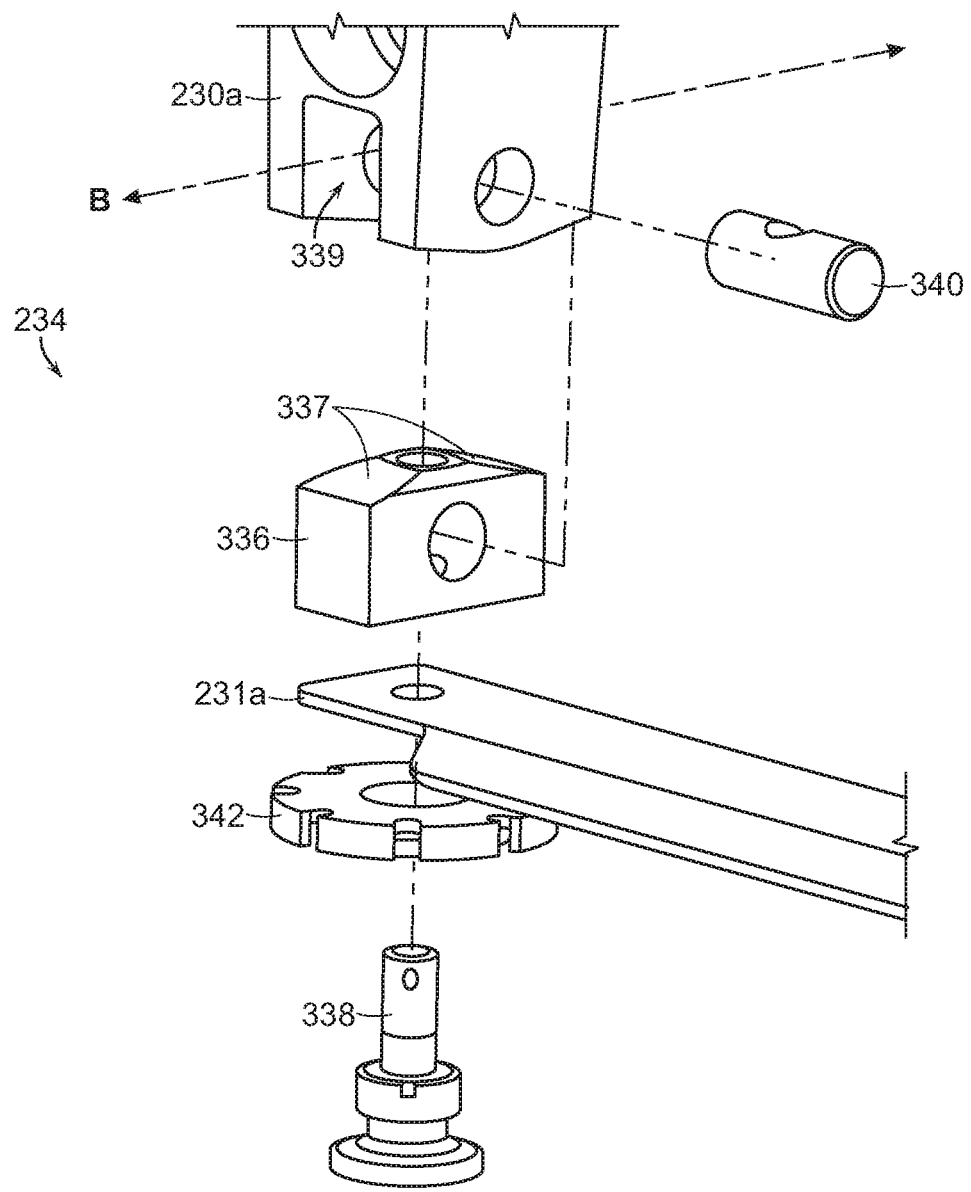
FIG. 3A is an enlarged, exploded isometric view.

More particularly, FIG. 3A is an enlarged, exploded isometric view of the seat assembly 100 illustrating one of the pivot features 234 configured in accordance with an embodiment of the present technology. In the illustrated embodiment, the pivot feature 234 includes a block 336 having a chamfered or beveled upper surface 337 and a threaded foot 338. The forward leg 230a can include a channel 339 formed in a lower end portion thereof and extending along an axis B, and the block 336 can be positioned within the channel 339. As shown, a barrel nut 340 is inserted through corresponding openings in the lower end portion of the forward leg 230a and the block 336 such that the barrel nut 340 is at least partially positioned within the block 336. The threaded foot 338 can be inserted through corresponding openings in the first spreader 231a and the block 336 and can be securely tightened within a corresponding threaded opening in the barrel nut 340. In some embodiments, the pivot feature 234 can further include an anti-rattle mechanism 342. In other embodiments, the pivot feature 234 can be operably coupled to the forward leg 230a via other suitable mechanisms.

When the foot 338 is secured against a surface (e.g., the floor of an aircraft) and a load is applied to the seat assembly 100 in a direction along the axis B (e.g., as a result of landing, takeoff, turbulence, etc.), the forward leg 230a can rotate/pivot about a pivot axis defined by the barrel nut 340 until an interior surface of the channel 339 contacts the upper surface 337 of the (e.g., stationary) block 336—which prevents further rotation of the forward leg 230a. The amount/degree of bevel of the upper surface 337 of the block 336 can be selected to permit a desired amount of rotation of the forward leg 230a.

Figure 3B:
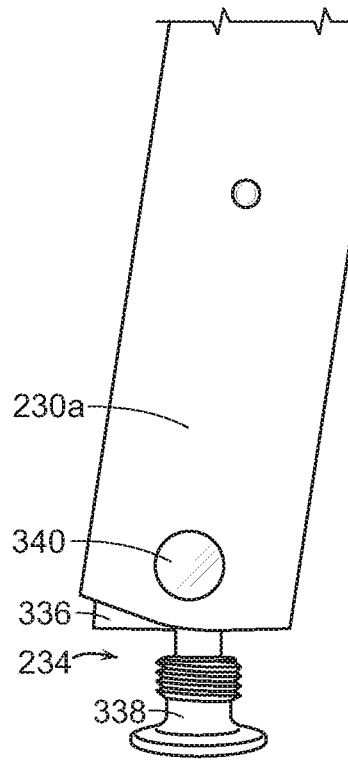
FIGS. 3B and 3C are enlarged front views of the seat assembly illustrating a pivot configured in accordance with an embodiment of the present technology.
Figure 3C:
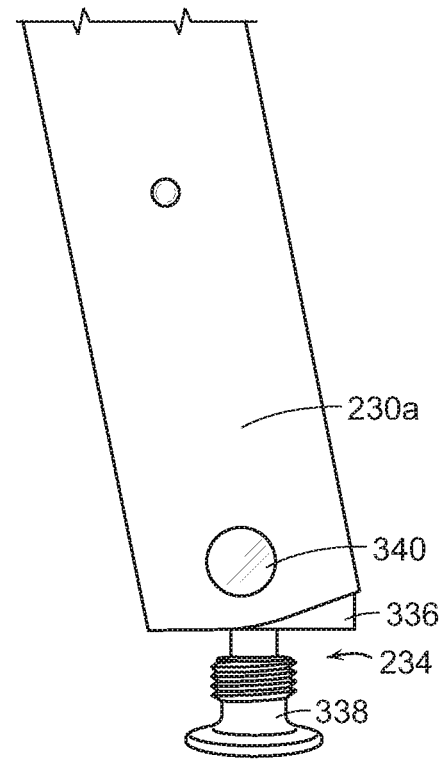

For example, FIGS. 3B and 3C are enlarged front views of the pivot feature 234 and the forward leg 230a configured in accordance with an embodiment of the present technology. FIG. 3B shows the forward leg 230a in a first rotational position relative to the pivot feature 234, for example, after a force in a first direction along the axis B (FIG. 3A) has been applied to the forward leg 230a. FIG. 3C shows the forward leg 230a in a second rotational position relative to the pivot feature 234, for example, after a force in a second direction, opposite to the first direction, along the axis B has been applied to the forward leg 230a. In some embodiments the upper surface 337 is shaped to permit a maximum side-to-side rotation of the forward leg 230a by about 10° (e.g., a total rotation of about 20° about the barrel nut 340). Referring to FIGS. 2A-3C together, the pivot feature 234 allows the forward legs 230a to pivot slightly side-to-side to more efficiently/evenly translate loads to the feet 338. This is expected to reduce the wear on the framework 102 of the seat assembly 100. In some embodiments, the channels 339 in the forward legs 230a are formed to be generally parallel to the crossbars 224 to, for example, enable pivoting of the seat assembly 100 in a direction perpendicular to the longitudinal axis of the vehicle into which the seat assembly 100 is installed. In such embodiments, the pivot features 234 can more efficiently transmit torsional loads on the seat assembly 100 to the frame of aircraft. In some embodiments, the pivot features 234 can ensure that no additional moment is applied to the legs 230 during a hard landing (e.g., a crash landing) or other high-force event (e.g., heavy turbulence).

Referring again to FIGS. 2A and 2B together, the seat pans 252 are slidably coupled to and suspended between adjacent pairs of the spreader assemblies 222. In some embodiments, the seat pans 252 can be generally similar or identical to one another and can be coupled to the spreader assemblies 222 in the same or a similar manner. For example, FIG. 4A a partially-exploded, rear isometric view of one of the seat pans 252 shown in FIGS. 2A and 2B configured in accordance with an embodiment of the present technology. FIG. 4B is a partially-exploded, front isometric view of one of the seat pans 252 and a corresponding one of the spreader assemblies 222 shown in FIGS. 2A and 2B configured in accordance with an embodiment of the present technology.

Figure 4A:
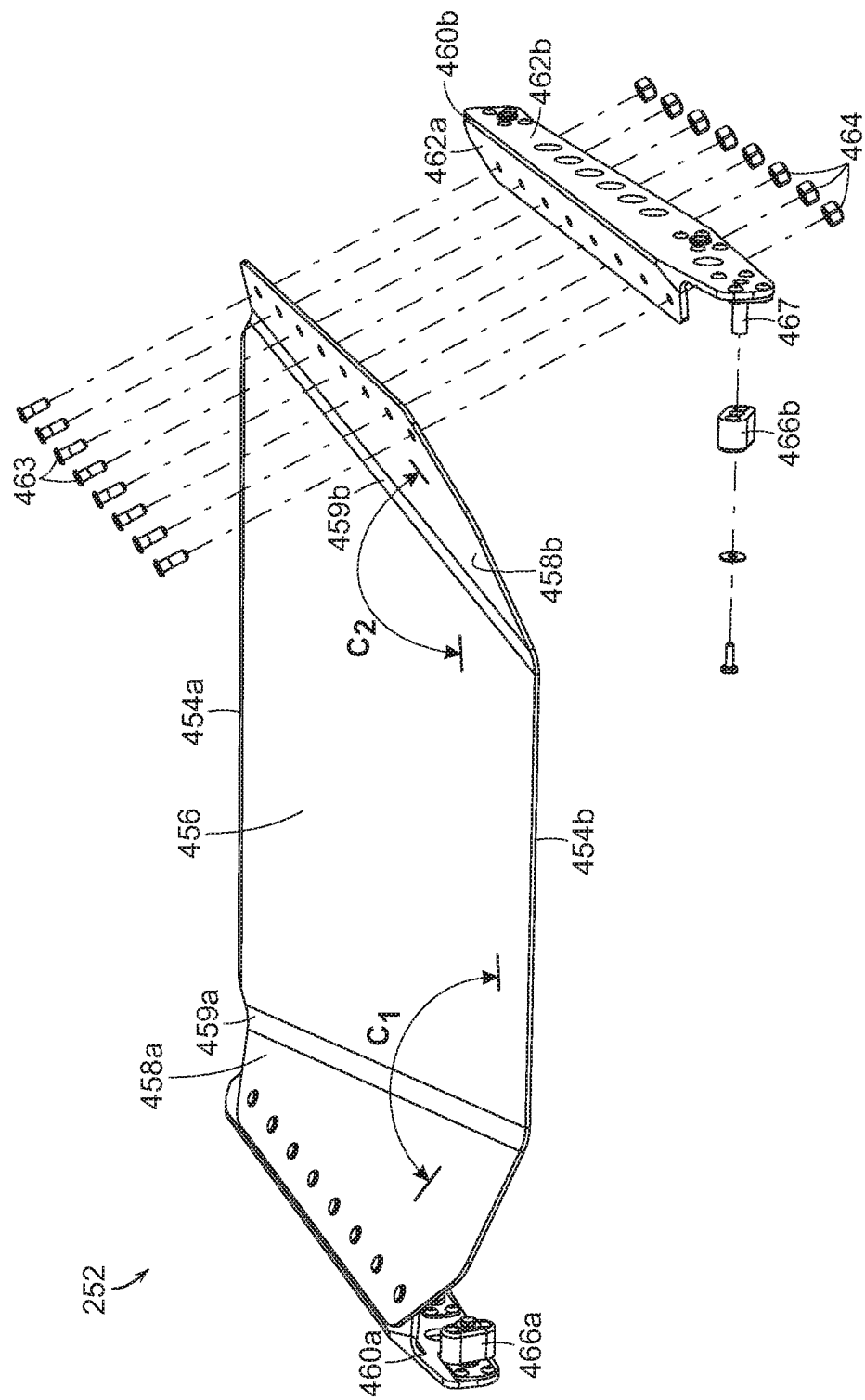
FIG. 4A a partially-exploded, rear isometric view of the seat assembly illustrating a seat pan configured in accordance with an embodiment of the present technology.
Figure 4B:
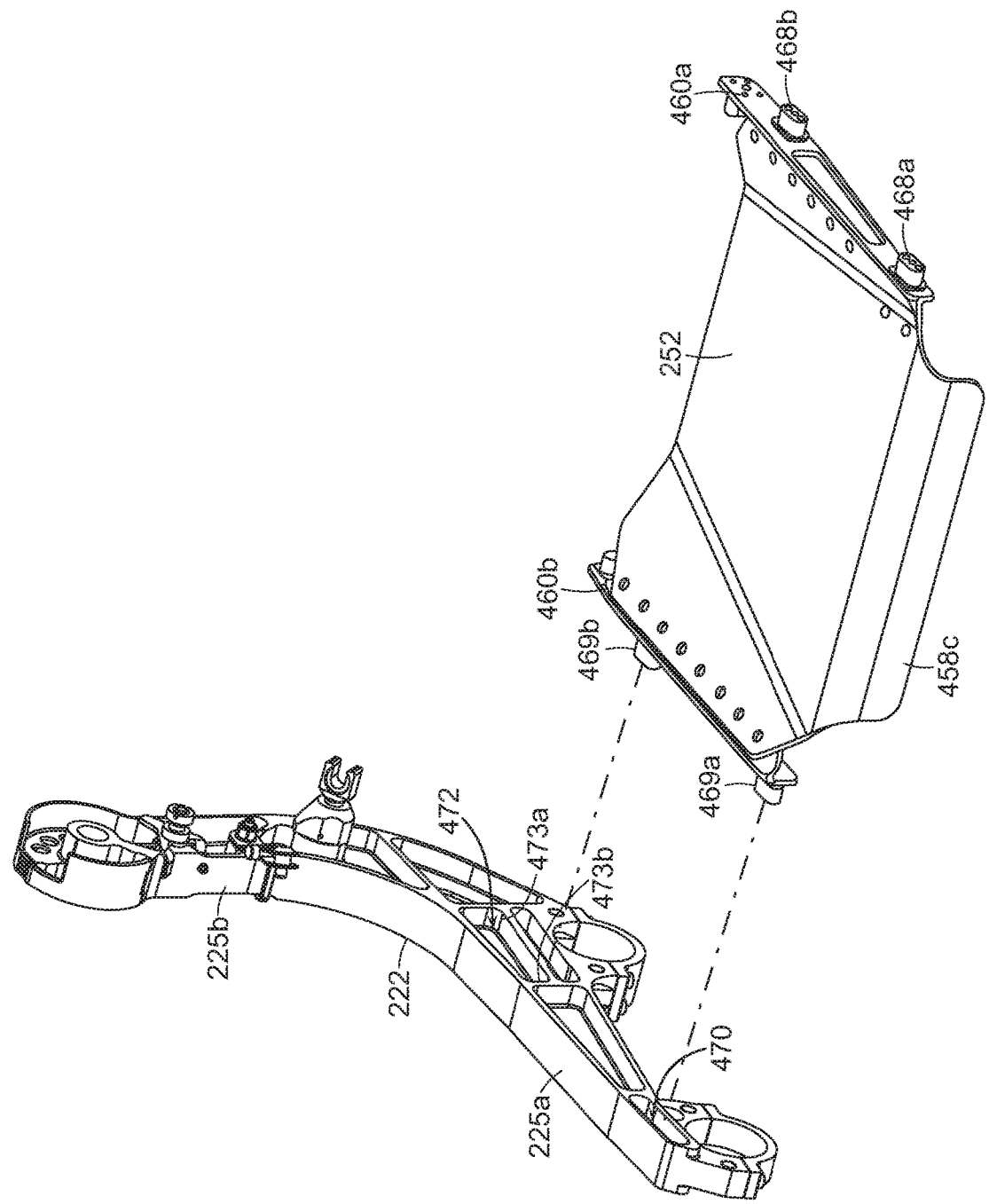
FIG. 4B is a partially-exploded, front isometric view of the seat assembly illustrating the seat pan of FIG. 4A and a spreader assembly configured in accordance with an embodiment of the present technology.

Referring first to FIG. 4A, the illustrated one of the seat pans 252 ("seat pan 252") includes a forward edge portion 454a, a rear edge portion 454b, a base portion 456, a first flange 458a extending from the base portion 456, and a second flange 458b extending from the base portion 456. The flanges 458 project from the base portion 456 at an angle such that the seat pan 252 has a concave or U-like shape. In some embodiments, for example an angle $C_1$ and/or an angle $C_2$ between the base portion 456 and the second flange 458b can be between about 120°-160° (e.g., about 140°, greater than about 130°, greater than about 140°, etc.). Moreover, in the illustrated embodiment the first and second flanges 458a and 458b meet the base portion 456 at creases 459a and 459b, respectively. In some embodiments, the creases 459 are tapered or angled between the edge portions 454 of the seat pan 252 such that the base portion 456 has a narrower width (e.g., in a direction between the flanges 458) near the rear edge portion 454b and a wider width near the forward edge portion 454a. The taper of the creases 459 between the edge portions 454 can be selected to generally match the increasing profile of a passenger seated on the seat pan 252 (e.g., from their posterior toward their knees). As described in greater detail below, it is expected that such a configuration will increase passenger comfort as the seat pan 252 flexes about the creases 459 to cradle or conform to the posterior shape of the passenger. In some embodiments, the seat pan 422 can include a third flange 458c (shown in FIG. 4B; obscured in FIG. 4A) that projects generally vertically downward from the base portion 456 at the forward edge portion 454a. In some embodiments, the third flange 458c is configured to engage the forward crossbar 224a (FIGS. 2A and 2B).

In some embodiments, the seat pan 252 is a unitary structure (e.g., comprising a single continuous part) formed from one or more composite materials to be lightweight yet strong enough to bear loads during use and to meet various safety requirements (e.g., regulations of the Federal Aviation Administration). For example, the seat pan 252 can be formed from a molded, composite material such as, for example, carbon fiber materials, fiberglass materials, a combination of multiple fiber reinforced plastic materials, etc. In some embodiments, the seat pan 252 is formed from sheets of unidirectional (UD) tape composites such as, for example, carbon fiber reinforced polymer (CFRP) laminate materials. In still other embodiments, the seat pan 252 can be formed from a metallic material such as aluminum or aluminum alloys.

As further shown in FIG. 4A, the first flange 458a of the seat pan 252 is configured to be attached to a first pan support assembly 460a and the second flange 458b is configured to be attached to a second pan support assembly 460b. The pan support assemblies 460 can be generally similar or identical to one another, but can have opposite (e.g., reflectively symmetric) orientations. In the illustrated embodiment, the second pan support assembly 460b includes (i) a planar first portion 462a configured to face and abut/engage the second flange 458b of the seat pan 252 and (ii) a planar second portion 462b configured to face a corresponding one of the spreader assemblies 222. In some embodiments, rivets 463 can be inserted through corresponding holes in the second flange 458b of the seat pan 252, through the first portion 462a of the second pan support assembly 460b, and into corresponding nuts 464 to secure the second flange 458b to the second pan support assembly 460b. The first flange 458a can be secured to the first pan support assembly 460a in the same or similar manner. In other embodiments, the flanges 458 can be secured to the pan support assemblies 460 via other suitable fasteners or techniques (e.g., via a welded connection).

In the illustrated embodiment, a first coupler 466a is rotatably coupled to the first pan support assembly 460a and a second coupler 466b is rotatably coupled to the second pan support assembly 460b. For example, the second coupler 466b is rotatably mounted to a pin 467 projecting from the second pan support assembly 460b. In other embodiments, the couplers 466 can be fixedly mounted to the pan support assemblies 460. As described in greater detail below, a corresponding one of the seat backs 250 (FIGS. 2A and 2B) can be operably coupled to the pan support assemblies 460 via the couplers 466 such that rotational movement of the seat back 250 drives translation (e.g., sliding) movement of the seat pan 252. In some embodiments, the pan support assemblies 460 are formed from a metal material such as aluminum or an aluminum alloy, or another material having enough strength to bear and transmit the loads on the seat pan 252.

Referring next to FIG. 4B, a first pair of sliders 468 (identified individually as a first slider 468a and a second slider 468b) are coupled to the first pan support assembly 460a, and a second pair of sliders 469 (identified individually as a first slider 469a and a second slider 469b) are coupled to the second pan support assembly 460b (e.g., to the second portion 462b of the second pan support assembly 460b). In some embodiments, the sliders 468, 469 can be identical or at least generally similar and can be formed from metal, composite, or other suitably strong materials. The sliders 468, 469 can be rotatably or fixedly coupled to the pan support assemblies 460 (e.g., in the same or a similar manner as the couplers 466), and are configured to project into and slide along slots in the adjacent pair of the spreader assemblies 222. For example, the illustrated one of the spreader assemblies 222 ("spreader assembly 222") includes a first slot/channel 470 and a second slot/channel 472 formed in the generally horizontal portion 225a thereof. The first slot 470 is configured (e.g., sized and shaped) to slidably receive the first slider 469a therein, and the second slot 472 is configured to slidably receive the second slider 469b therein.

In operation, the sliders 469 are constrained to move within the slots 470, 472 and can generally slide in a first, forward direction (e.g., in a direction generally away from the vertical portion 225b of the spreader assembly 222) and a second, rearward direction (e.g., in a direction generally toward the vertical portion 225b of the spreader assembly 222). Movement in the first direction correspondingly causes the seat pan 252 to slide forward while movement in the second direction causes the seat pan 252 to slide rearward. In some embodiments, the length of the slots 470, 472 can be selected to provide a desired maximum amount of forward movement of the seat pan 252. For example, one or both of the slots 470, 472 can have a length that permits the seat pan 252 to slide forward by about 1 inch to 2 inches (e.g., by about 1.5 inches).

In general, the position and angle of the slots 470 and 472 can be selected to provide a desired angle/pitch of the seat pan 252. For example, the second slot 472 can be formed in the spreader assembly 222 such that a lower surface of the second slot 472 has an elevation (e.g., a vertical elevation above a surface to which the seat assembly 100 is mounted) that is less than the elevation of a lower surface of the first slot 470. In such embodiments, the elevation of the first slider 469a can be greater than the elevation of the second slider 469b such that the seat pan 252 has a positive pitch (e.g., has a positive slope in a direction from the rear edge portion 454b toward the forward edge portion 454a). Conversely, the elevation of the lower surface of the second slot 472 could be greater than the elevation of the lower surface of the first slot 470 such that the seat pan 252 has a negative pitch (e.g., has a negative slope in a direction from the rear edge portion 454b toward the forward edge portion 454a).

Similarly, in some embodiments one or both of the slots 470, 472 can be angled (e.g., angled off a plane horizontal to the surface to which the seat assembly 100 is mounted) such that movement of the sliders 469 along the slots 470, 472 simultaneously causes a change in the pitch of the seat pan 252. For example, the second slot 472 can have positive slope in a direction between a first end portion 473a and a second end portion 473b thereof. In such embodiments, movement of the second slider 469b along the second slot 472 from the first end portion 473a toward the second end portion 473b can increase the elevation of the second slider 469b relative to the elevation of the first slider 469a to thereby decrease the pitch of the seat pan 252. Alternatively, the second slot 472 can have a negative slope in the direction between the first end portion 473a and the second end portion 473b such that movement of the second slider 469b along the second slot 472 from the first end portion 473a toward the second end portion 473b increases the pitch of the seat pan 252. The sliders 468 of the first pan support assembly 460a can be positioned within corresponding slots in the other of the adjacent pair of the spreader assemblies 222 in the same or similar manner as the sliders 469 of the second pan support assembly 460b, and the angles and/or positions of the various slots can be varied to provide a desired pitch for the seat pan 252 at any position along its path of movement.

In another aspect of the present technology, the seat pan 252 is suspended between the pair of adjacent spreader assemblies 222 and is supported only at the flanges 458 where the seat pan 252 is coupled to the pan support assemblies 460. In some embodiments, the seat pan 252 is configured to flex/bend when subjected to a load—for example, the weight of a passenger seated thereon. More specifically, the weight of a passenger causes the flanges 458 to flex/bend inwardly about the base portion 456 to increase the concavity of the seat pan 252 (e.g., to decrease the angles $C_1$, $C_2$ and pinch the flanges 458 toward one another). In this manner, the seat pan 252 is configured to conform to the shape of the posterior of a passenger seated thereon to, for example, simulate a deeper/thicker cushion, and is expected to thereby increase the comfort of the passenger. Moreover, when the seat pan 252 flexes in response to the weight of the passenger, the sliders 468, 469 are thereby pushed/urged outwardly into the slots (e.g., the slots 470, 472) in the spreader assemblies 222. This has the added advantage of inhibiting or even preventing the sliders 468, 469 from disengaging the slots when a passenger is seated on the seat pan 252.

Moreover, referring to FIGS. 2A, 2B, 4A, and 4B together, enabling the seat pan 252 to flex can provide a more stable/even load path from the seat pan 252 to the framework 102 and to a surface to which the seat assembly 100 is mounted as compared to a conventional, non-flexing seat pan. For example, when the seat pan 252 flexes the load is directed more vertically through the framework 102 (e.g., the legs 230) which can reduce the stress on the seat pan 252. In some embodiments, the seat pan 252 is configured to contact one or both of the crossbars 224 during a high-force event (e.g., during a crash landing, during heavy turbulence, etc.). For example, the seat pan 252 can flex until a lower surface of the base portion 456 contacts the crossbars 224, which provides additional support for the seat pan 252 and a passenger seated thereon. More specifically, the seat pan 252 can spread the load from the contact with the crossbars 224 to a cushion on the seat pan 252 (e.g., one of the cushions 105 shown in FIG. 1A) to thereby reduce the load on/through the lumbar region of the passenger from the high-force event. Further, in some embodiments the seat pan 252 can have a rigidity that prevents the passenger from feeling the crossbars 224 during the high-force event.

Referring again to FIGS. 2A and 2B, the seat backs 250 are pivotally coupled between adjacent pairs of the spreader assemblies 222. In some embodiments, the seat backs 250 can be generally similar or identical to one another and can be coupled to the spreader assemblies 222 in the same or a similar manner. Moreover, the seat backs 250 can include some features generally similar to the features of the seat pans 252 described in detail above.

Figure 5A:
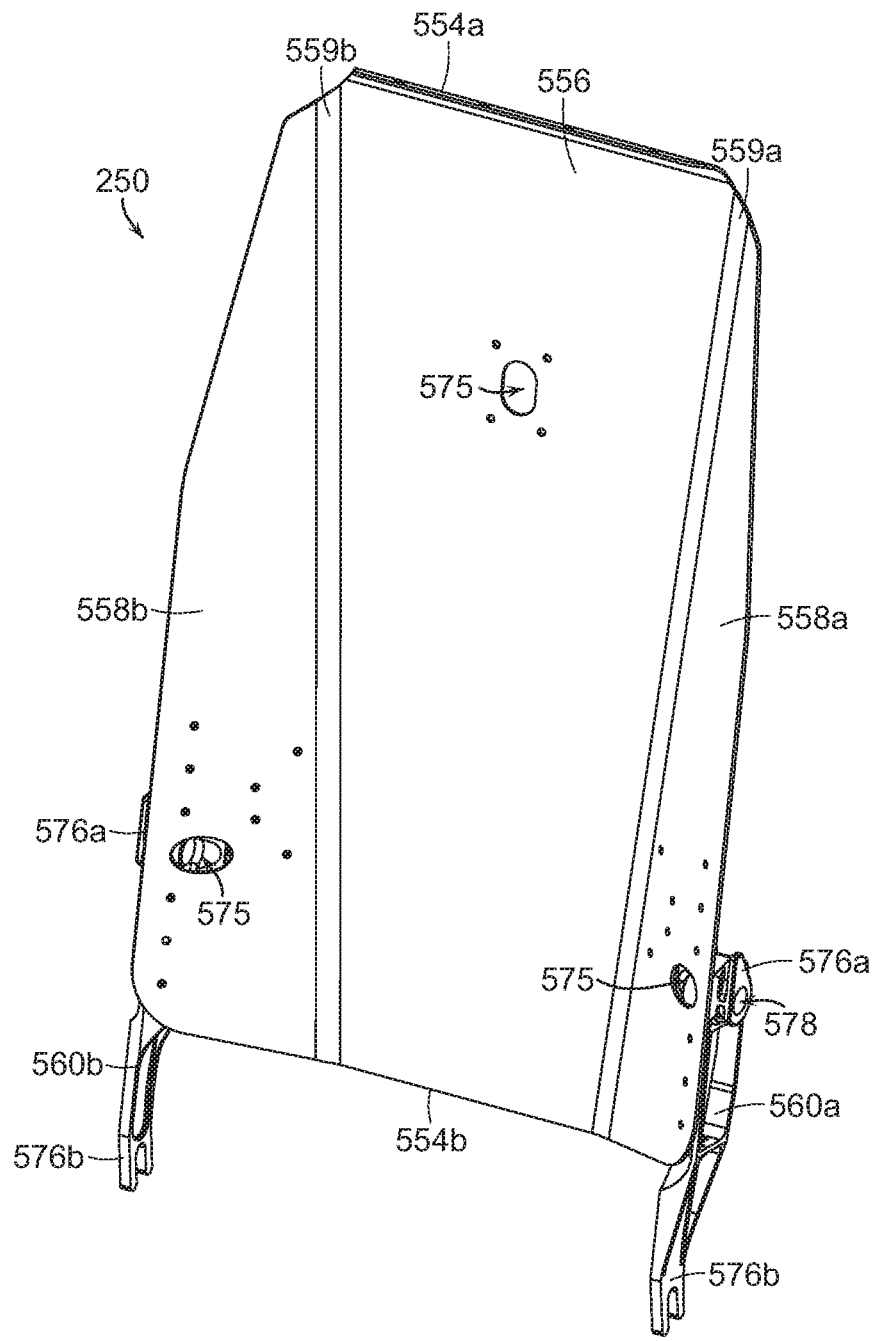
FIG. 5A is a front isometric view of the seat assembly illustrating a seat back configured in accordance with an embodiment of the present technology.

For example, FIG. 5A is a front isometric view of one of the seat backs 250 shown in FIGS. 2A and 2B configured in accordance with an embodiment of the present technology. In the illustrated embodiment, the illustrated one of the seat backs 250 ("seat back 250") includes an upper edge portion 554a, a lower edge portion 554b, a base portion 556, a first flange 558a extending from the base portion 556, and a second flange 558b extending from the base portion 556. The flanges 558 project from the base portion 556 at angle such that the seat back 250 has a concave or U-like shape. In some embodiments, for example an angle between the base portion 556 and the flanges 558 can be between about 120°-160° (e.g., about 140°, greater than about 130°, greater than about 140°, etc.). Moreover, in the illustrated embodiment the first and second flanges 558a and 558b meet the base portion 556 at creases 559a and 559b, respectively. In some embodiments, the creases 559 are tapered or angled between the edge portions 554 of the seat back 250 such that the base portion 556 has a narrower width (e.g., in a direction between the flanges 558) near the lower edge portion 554b and a wider width near the upper edge portion 554a. The taper of the creases 559 between the edge portions 554 can be selected to generally match the increasing profile of a passenger seated on the seat pan 252 (e.g., from their lower back toward their upper back and shoulders). When the passenger leans back against the seat back 250, it is expected that the configuration of the seat back 250 will be more comfortable for the passenger as the seat back 250 flexes about the creases 559 to cradle or conform to the back of the passenger. As further shown in FIG. 5A, in some embodiments the seat back 250 can include one or more lightening holes 575 to make the seat back 250 lighter. In other embodiments, the seat back 250 can include more fewer than the three illustrated lightening holes 575 and/or the lightening holes 575 can be formed through different portions of the seat back 250.

In some embodiments, the seat back 250 is a unitary structure (e.g., comprising a single continuous part) formed from one or more composite materials to be lightweight yet strong enough to bear loads during use and to meet various safety requirement (e.g., regulations of the Federal Aviation Administration). For example, the seat back 250 can be formed from a molded, composite material such as, for example, carbon fiber materials, fiberglass materials, a combination of multiple fiber reinforced plastic materials, etc. In some embodiments, the seat back 250 is formed from sheets of UD tape composites such as, for example, CFRP laminate materials. In certain embodiments, the seat back 250 can be manufactured as part of the same process (e.g., molding or stamping process) as the seat pan 252 (FIGS. 4A and 4B).

Figure 5B:
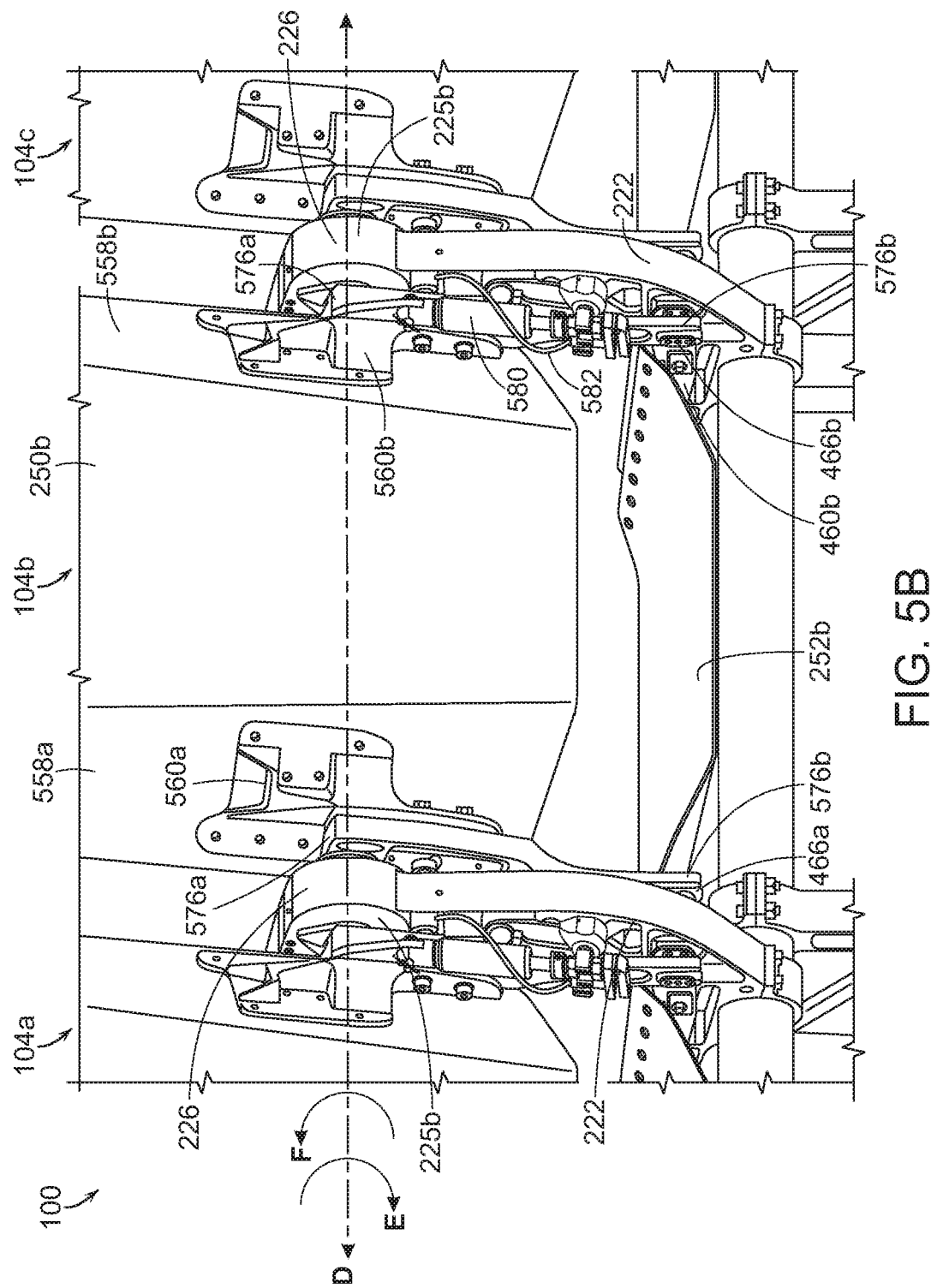
FIG. 5B is an enlarged, rear isometric view of the seat assembly configured in accordance with an embodiment of the present technology.

FIG. 5B is an enlarged, rear isometric view of the seat assembly 100 shown in FIGS. 2A and 2B configured in accordance with an embodiment of the present technology. FIG. 5B more particularly illustrates a portion of the second seat back 250b and the second seat pan 252b. For the sake of clarity, the second seat back 250b and the second seat pan 252b are referred to as seat back 250 and seat pan 252 in the description below. Referring to FIGS. 5A and 5B together, the first flange 558a of the seat back 250 is configured to be attached to a first back support assembly 560a and the second flange 558b is configured to be attached to a second back support assembly 560b. The back support assemblies 560 can be generally similar or identical to one another, but can have opposite (e.g., reflectively symmetric) orientations. In some embodiments, the back support assemblies 560 are secured to the flanges 558 via a plurality of bolts, rivets, fasteners, etc., while in other embodiments the back support assemblies 560 are secured to the flanges 558 via a weld or other suitable means of attachment. Each of the back support assemblies 560 can include an upper portion 576a and a lower portion 576b.

In the illustrated embodiment, the upper portions 576a of the back support assemblies 560 include a pivot point, such as an aperture 578 formed therein (FIG. 5A; the aperture 578 in the second back support assembly 560b is obscured in FIG. 5A), about which the seat back 250 is configured to rotate. For example, in some embodiments the apertures 578 are each configured to receive a pin that is coupled to the vertical portion 225b of a corresponding ones of the spreader assemblies 222 to permit the seat back 250 to rotate about a pivot axis D (shown in FIG. 5B). In one aspect of the present technology, the pivot axis D of the seat back 250 is positioned relatively high above the lower edge portion 554b of the seat back 250. That is, rather than pivoting at or proximate to the lower edge portion 554b, the seat back 250 is configured to pivot along an axis that is at a greater elevation (e.g., a greater vertical elevation above a surface to which the seat assembly 100 is mounted) than many conventional seat backs.

For example, in some embodiments the pivot axis D can be spaced apart from the surface to which the seat assembly 100 is mounted (e.g., the floor of an airplane) by greater than 16 inches. In some embodiments, the pivot axis D is spaced apart from the surface to which the seat assembly 100 is mounted by at least about 18 inches, by at least about 20 inches, by at least about 22 inches, by at least about 22.5 inches, etc. In a particular embodiment, the pivot axis D is spaced apart from the surface to which the seat assembly 100 is mounted by about 22.5 inches. As used herein, the term "about" can mean both an exact value and a value having a reasonable tolerance from the exact value. For example, in a particular embodiment the height of the pivot axis D above the surface to which the seat assembly 100 is mounted can have a reasonable tolerance of approximately ½ to 2 inches. In still other embodiments, a reasonable tolerance for a particular dimension can be determined by a person of ordinary skill in the art. In contrast, conventional seat assemblies typically include a pivot axis that is spaced apart from a mounting surface by about 16 inches. Moreover, the pivot axis D is spaced apart from the lower edge portion 554b of the seat back 250 and the seat pan 252. In this manner, the pivot axis D can be positioned above the knee level of an aft passenger seated directly behind the seat back 250. In contrast, conventional seat assemblies typically position the pivot axis of the seat back at or near a lower edge of the seat back and/or the seat pan. The higher pivot axis of the present technology is expected to reduce the intrusion of the seat back 250 into the space of an aft passenger seated directly behind the seat back 250 by, for example, causing the seat back 250 to be positioned higher above the knees of the aft passenger. In some embodiments, the armrest assemblies 226 are rotatably coupled to the spreader assemblies 222 along the same pivot axis D.

In the illustrated embodiment, the lower portions 576b of the back support assemblies 560 are configured to engage the couplers 466 of the pan support assemblies 460 (the first pan support assembly 460a is obscured in FIG. 5B). More particularly, the lower portions 576b can have a forked shape or configuration adapted to mate with the couplers 466. In other embodiments, the lower portions 576b of the back support assemblies 560 can be operably coupled to the couplers 466 in other manners (e.g., via fasteners, a welded connection, etc.). In one aspect of the present technology, the engagement of the lower portions 576b of the pan support assemblies 560 with the couplers 466 mechanically couples the seat back 250 to the seat pan 252 such that they are synchronized to move together. That is, as described in greater detail below, rotation of the seat back 250 about the pivot axis D can simultaneously drive the seat pan 252 to move forward or rearward.

As shown in FIG. 5B, an actuator 580 can be mounted between the second back support assembly 560b and one of the adjacent pair of the spreader assemblies 222 ("spreader assembly 222"). Accordingly, the actuator 580 is fixedly mounted at one end to the spreader assembly 222 and movably mounted at one end to the seat back 250. The actuator 580 is configured to enable rotational movement of the seat back 250 about the pivot axis D. For example, the actuator 580 can be a hydraulic lock that is manually actuatable by a user to lock/unlock movement of the seat back 250. In specific embodiments, the actuator 580 can be a hydraulic lock manufactured by Crane Aerospace & Electronics, of Stamford, Conn., such as any of the hydraulic locks manufactured and sold under the trademark "HYDROLOK." In some embodiments, the actuator 580 can be operably coupled to a control cable 582 that can be threaded through/along the spreader assembly 222 and operably coupled to a corresponding one of the buttons 109 ("button 109"; FIG. 1A).

Figure 6A:
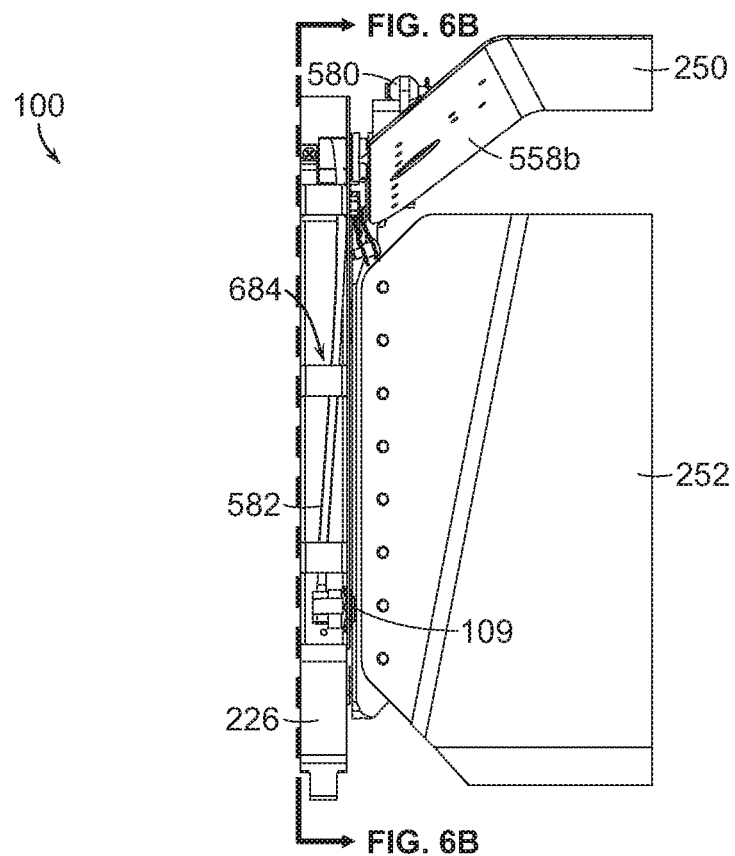
FIG. 6A is an enlarged top view of a portion of the seat assembly.
Figure 6B:
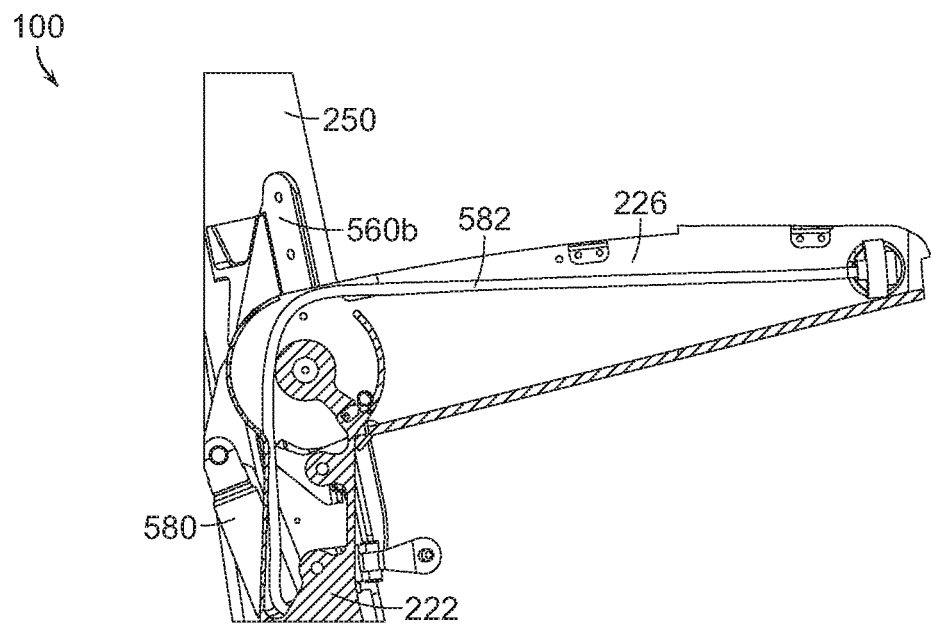
FIG. 6B is a side cross-sectional view of the portion of the seat assembly illustrating an actuator control cable in accordance with an embodiment of the present technology.

For example, FIG. 6A is an enlarged top view of a portion of the seat assembly 100 illustrating the path of the control cable 582 in accordance with an embodiment of the present technology. FIG. 6B is a side cross-sectional view of the seat assembly 100 taken through the line indicated in FIG. 6A. Referring to FIGS. 6A and 6B together, the control cable 582 can extend from the actuator 580 upward through/along the spreader assembly 222 and through a channel 684 in a corresponding one of the armrest assemblies 226 to the button 109, which is accessible to a passenger seated on the seat pan 252.

Referring to FIGS. 4A-6B together, a passenger seated in one of the seats 104 ("seat 104") can actuate (e.g., depress) the button 109 to move the seat back 250 between the reclined position and the upright position (shown in FIG. 1A). Specifically, depressing the button 109 unlocks the actuator 580 to permit rotational movement of the seat back 250 about the pivot axis D. With the button 109 depressed, the passenger can lean back to rotate the seat back 250b about the pivot axis D, which compresses the actuator 580. At the same time, the rotational movement of the seat back 250 is transmitted to the seat pan 252 via the mechanical coupling of the back support assemblies 560 to the couplers 466 of the pan support assemblies 460. For example, when the seat back 250 is moved from the upright position to the reclined position (e.g., as the seat back 250 is rotated about the pivot axis D in a direction E indicated by the arrow E in FIG. 5B), the back support assemblies 560 simultaneously drive the sliders 468, 469 forward (e.g., in a direction away from the vertical portions 225b of the spreader assemblies 222 and the seat back 250) along the slots in the adjacent pair of the spreader assemblies 222 to move the seat pan 252 forward. Conversely, when the seat back 250 is moved from the reclined position to the upright position (e.g., as the seat back 250 is rotated about the pivot axis D in a direction F indicated by the arrow F in FIG. 5B), the back support assemblies 560 simultaneously drive the sliders 468, 469 rearward (e.g., in a direction toward the vertical portions 225b of the spreader assemblies 222 and the seat back 250) along the slots in the adjacent pair of the spreader assemblies 222 to move the seat pan 252 rearward. In some embodiments, the actuator 580 can drive rotation of the seat back 250 from the reclined position to the upright position, for example, via the energy stored in the actuator 580 as a result of compressing the actuator 580 during movement of the seat back 250 from the upright position to the reclined position.

In this manner, the seat assembly 100 increases the effective amount of recline of the seat 104 without further encroaching on the space of an aft passenger. For example, in some embodiments the forward movement of the seat pan 252 can provide an effective recline of about 5 inches (e.g., about 4.8 inches; corresponding to 9.4° of recline) while only intruding on the space of the aft passenger by about 3 inches. In some embodiments, the aft passenger has relatively more knee space when the seat 104 is in the reclined position as the seat pan 252 is slid forward away from their knees and the pivot axis D of the seat back 250 is positioned above their knees. Accordingly, the seat assembly 100 is expected to increase passenger comfort for both passengers seated in the seats 104 and for aft passengers seated behind the seat assembly 100.

Moreover, only one actuator per seat is required to achieve both transitional movement of the seat pan 252 and rotational movement of the seat back 250. That is, each of the seat backs 250 can have only a single actuator operably coupled thereto.

In another aspect of the present technology, as best seen in FIGS. 5B and 6A, the actuator 580 is mounted behind the second flange 558b of the seat back 250b and is therefore off-center with respect to a central, vertical axis of the seat back 250. In some embodiments, the actuator 580 can be entirely contained within the space behind the second flange 558b and thus the seat 104 can be made relatively thin. Moreover, this arrangement still allows the seat pan 252 to be driven evenly and smoothly because the back support assemblies 560 engage and drive both of the pan support assemblies 460—which are located at opposite sides of the seat pan 252. Moreover, in some embodiments various electronics (e.g., for powering the display screens 112; FIG. 1B) can be positioned in the space behind the flanges 558 without adding to the thickness of the seats 104.

Figure 7:
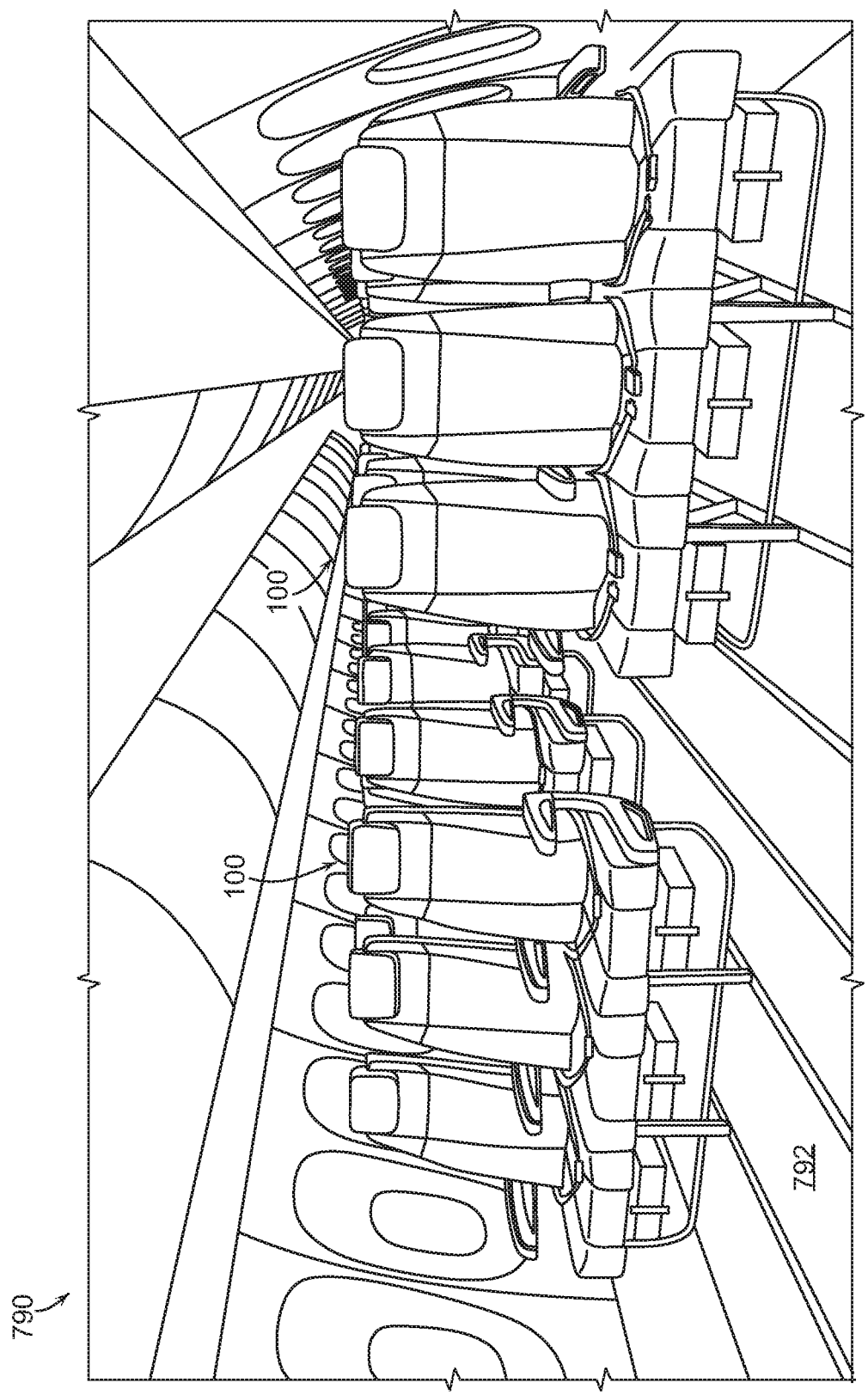
FIG. 7 is a front perspective view a cabin of an aircraft having a plurality of the seat assemblies installed therein in accordance with an embodiment of the present technology.

FIG. 7 is a front perspective view a cabin of an aircraft 790 having a plurality of the seat assemblies 100 installed therein in accordance with an embodiment of the present technology. In the illustrated embodiment, multiple seat assemblies 100 are secured to a floor 792 of the of the aircraft 790 and arranged in two rows. As described above, in other embodiments the seat assemblies 100 can have a different number of the seats 104 (e.g., one, two, four, five, or more seats) depending on the size of the aircraft 790 and/or a desired passenger layout. In some embodiments, the seat assemblies 100 are specifically configured for use in an "economy" or "high passenger density" layout/portion of the aircraft 790. In some embodiments, the seat assemblies can be configured (e.g., shaped) for installation into specific types of aircraft—for example, common commercial aircraft such as variants of the Boeing 737, Airbus A320, Comac C919, etc.

The above detailed description of embodiments of the technology are not intended to be exhaustive or to limit the technology to the precise form disclosed above. Although specific embodiments of, and examples for, the technology are described above for illustrative purposes, various equivalent modifications are possible within the scope of the technology as those skilled in the relevant art will recognize. For example, although steps are presented in a given order, alternative embodiments may perform steps in a different order. The various embodiments described herein may also be combined to provide further embodiments.

From the foregoing, it will be appreciated that specific embodiments of the technology have been described herein for purposes of illustration, but well-known structures and functions have not been shown or described in detail to avoid unnecessarily obscuring the description of the embodiments of the technology. Where the context permits, singular or plural terms may also include the plural or singular term, respectively.

Moreover, unless the word "or" is expressly limited to mean only a single item exclusive from the other items in reference to a list of two or more items, then the use of "or" in such a list is to be interpreted as including (a) any single item in the list, (b) all of the items in the list, or (c) any combination of the items in the list. Additionally, the term "comprising" is used throughout to mean including at least the recited feature(s) such that any greater number of the same feature and/or additional types of other features are not precluded. It will also be appreciated that specific embodiments have been described herein for purposes of illustration, but that various modifications may be made without deviating from the technology. Further, while advantages associated with some embodiments of the technology have been described in the context of those embodiments, other embodiments may also exhibit such advantages, and not all embodiments need necessarily exhibit such advantages to fall within the scope of the technology. Accordingly, the disclosure and associated technology can encompass other embodiments not expressly shown or described herein.

We claim:

1. An aircraft seat, comprising:
   a framework configured to be coupled to a floor of the aircraft, wherein the framework includes a first back support assembly and a second back support assembly;
   a seat back pivotally coupled to the framework and rotatable about a pivot axis between an upright position and a reclined position, wherein the seat back includes a base portion, a first flange projecting from the base portion at a first non-zero angle, and a second flange projecting from the base portion opposite the first flange and at a second non-zero angle, wherein the first back support assembly is attached to the first flange, and wherein the second back support assembly is attached to the second flange; and
   a seat pan slidably coupled to the framework and movable between a rear position and a forward position.

2. The aircraft seat of claim 1 wherein the seat back and the seat pan are mechanically coupled to move together between (a) a first position in which the seat back is in the upright position and the seat pan is in the rear position and (b) a second position in which the seat back is in the reclined position and the seat pan is in the forward position.

3. The aircraft seat of claim 1 further comprising a hydraulic lock actuator, wherein the hydraulic lock actuator is operably coupled between the framework and the first flange, and wherein the hydraulic lock actuator is the only actuator coupled to the seat back.

4. The aircraft seat of claim 1 wherein the framework includes a first spreader assembly and a second spreader assembly opposite the first spreader assembly,
   wherein the first back support assembly is pivotally mounted to the first spreader assembly, and
   wherein the second back support assembly is pivotally mounted to the second spreader assembly.

5. A seat for installation into a passenger vehicle, the seat comprising:
   a framework including a first leg assembly and a second leg assembly, wherein the first and second leg assemblies each include (a) a first leg configured to be rigidly mounted to the vehicle and (b) a second leg configured to be pivotally coupled to the vehicle;
   a seat back pivotally coupled to the framework and movable between an upright position and a reclined position; and
   a seat pan slidably coupled to the framework and movable between a rear position and a forward position,
      wherein the seat back is operably coupled to the seat pan such that movement of the seat back from the upright position to the reclined position moves the seat pan from the rear position to the forward position.

6. The seat of claim 5 wherein the seat back is mechanically coupled to the seat pan such that the seat back and seat pan are mechanically synchronized to move together.

7. The seat of claim 5 wherein the framework includes a first spreader assembly and a second spreader assembly opposite the first spreader assembly, and wherein the seat further comprises:
   a first pan support assembly coupled to the seat pan, wherein the first pan support assembly includes first sliders configured to slidably engage first slots formed in the first spreader assembly; and
   a second pan support assembly coupled to the seat pan, wherein the second pan support assembly includes second sliders configured to slidably engage second slots formed in the second spreader assembly.

8. The seat of claim 7 wherein at least one of the first slots is angled off-horizontal and wherein at least one of the second slots is angled off-horizontal such that movement of the seat pan between the forward and rear positions changes a pitch of the seat pan.

9. The seat of claim 7, further comprising:
   a first back support assembly coupling the seat back to the first spreader assembly; and
   a second back support assembly coupling the seat back to the second spreader assembly, wherein the first back support assembly is configured to engage the first pan support assembly and the second back support assembly is configured to engage the second pan support assembly to drive movement of the seat pan.

10. The seat of claim 7 wherein:
   the seat pan includes a base portion, a first flange projecting from the base portion at a first angle, and a second flange opposite the first flange and projecting from the base portion at a second angle;
   the first pan support assembly is coupled to the first flange; and
   the second pan support assembly is coupled to the second flange.

11. The seat of claim 10 wherein, in response to a load applied to the seat pan, the seat pan is configured to flex such that first angle and the second angle decrease.

12. The seat of claim 10 wherein the first and second angles are greater than about 130°.

13. The seat of claim 5 wherein the second leg of each leg assembly is configured to rotate about a pivot axis by less than about 20°.

14. The seat of claim 5 wherein the seat pan is a unitary structure formed from a material selected from the group consisting of a unidirectional tape, a fabric, short fiber composites, or thermal plastic sheets.

15. The seat of claim 14 wherein the seat back is a unitary structure formed from a material selected from the group consisting of a unidirectional tape, a fabric, short fiber composites, or thermal plastic sheets.

16. A seat assembly for installation into a vehicle, the seat assembly comprising:

a framework configured to be mounted within the vehicle; and a seat (a) a seat pan slidably coupled to the framework and (b) a seat pivotally coupled to the framework, wherein the seat pan includes a base portion, a first flange projecting from the base portion at a first non-zero angle, and a second flange opposite the first flange and projecting from the base portion at a second non-zero angle, wherein the first flange is slidably coupled to a first portion of the framework, wherein the second flange is slidably coupled to a second portion of the framework, wherein, when a load is applied to the seat pan, the first and second flanges are configured to flex relative to the base portion such that the first and second non-zero angles change, wherein the seat back is rotatable between an upright position and a reclined position, and wherein the seat back is operably coupled to the seat pan such that movement of the seat back from the upright position to the reclined position slides the seat pan along the framework away from seat back.

17. The seat assembly of claim 16, wherein the framework includes a first leg assembly and a second leg assembly, and wherein the first and second leg assemblies each includes a first leg configured to be fixedly mounted to the vehicle and a second leg configured to be pivotally coupled to the vehicle.

18. The seat assembly of claim 16 wherein the seat back is (a) a unitary structure formed from a composite material and (b) configured to flex in response to a load applied to the seat back.

19. The aircraft seat of claim 1 wherein the first and second non-zero angles are each between about 120° to about 160°.

20. The aircraft seat of claim 1 wherein the seat back is a unitary structure formed from a material selected from the group consisting of a unidirectional tape, a fabric, short fiber composites, and thermal plastic sheets.

21. The aircraft seat of claim 20 wherein the seat back is configured to flex in response to a load applied to the seat back.

22. The seat of claim 7 wherein the seat back is a unitary structure formed from a composite material, and wherein the seat back is configured to flex in response to a load applied to the seat back.

23. The seat assembly of claim 16 wherein the framework includes a crossbar extending beneath the seat pan, and wherein the seat pan is configured to flex such that the base portion of the seat pan contacts the crossbar when the load is applied to the seat pan.

\* \* \* \* \*

UNITED STATES PATENT AND TRADEMARK OFFICE
CERTIFICATE OF CORRECTION

PATENT NO. : 11,040,775 B2
APPLICATION NO. : 16/266906
DATED : June 22, 2021
INVENTOR(S) : Charles K. Wong et al.

It is certified that error appears in the above-identified patent and that said Letters Patent is hereby corrected as shown below:

In the Specification

In Column 6, Line 47, delete "installed" and insert -- installed. --, therefor.

In Column 14, Line 58, delete "of the of the" and insert -- of the --, therefor.

In the Claims

In Column 17, Line 21, in Claim 16, before "(a)" insert -- including --.

In Column 17, Line 22, in Claim 16, after "seat" insert -- back --.

In Column 18, Line 7, in Claim 17, delete "claim 16," and insert -- claim 16 --, therefor.

In Column 18, Line 9, in Claim 17, delete "includes" and insert -- include --, therefor.

Signed and Sealed this
Seventeenth Day of May, 2022

Katherine Kelly Vidal
*Director of the United States Patent and Trademark Office*